United States Patent
Mizoguchi et al.

(10) Patent No.: US 11,468,772 B2
(45) Date of Patent: Oct. 11, 2022

(54) VEHICLE DRIVE-ASSIST APPARATUS

(71) Applicant: SUBARU CORPORATION, Tokyo (JP)

(72) Inventors: Masato Mizoguchi, Tokyo (JP); Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 438 days.

(21) Appl. No.: 16/374,225

(22) Filed: Apr. 3, 2019

(65) Prior Publication Data

US 2019/0385459 A1 Dec. 19, 2019

(30) Foreign Application Priority Data

Jun. 13, 2018 (JP) .............................. JP2018-112850

(51) Int. Cl.
*G08G 1/16* (2006.01)
*B60W 30/09* (2012.01)
*B60W 30/16* (2020.01)
*B60W 10/20* (2006.01)

(52) U.S. Cl.
CPC ............. *G08G 1/166* (2013.01); *B60W 30/09* (2013.01); *B60W 30/16* (2013.01); *G08G 1/167* (2013.01); *B60W 10/20* (2013.01); *B60W 2554/00* (2020.02)

(58) Field of Classification Search
CPC ....... G08G 1/166; B60W 30/09; B60W 30/16
See application file for complete search history.

(56) References Cited

U.S. PATENT DOCUMENTS 6,265,990 B1 * 7/2001 Isogai .................... G08G 1/167
340/903

FOREIGN PATENT DOCUMENTS

JP 2001-101599 A 4/2001
JP 3436202 B2 * 8/2003

OTHER PUBLICATIONS

Machine Translation of Sukeyuki's reference (JP 3436202 B2) (Year: 2003).*

* cited by examiner

*Primary Examiner* — Russell Frejd
*Assistant Examiner* — Tarek Elarabi
(74) *Attorney, Agent, or Firm* — McDermott Will & Emery LLP

(57) ABSTRACT

A vehicle drive-assist apparatus includes: a first front-environment recognizer recognizing, with a vehicle-mounted autonomous sensor, a front environment; a second front-environment recognizer recognizing the front environment on the basis of information received from an external device via external communication; a first brake controller determining, when a preceding vehicle is recognized by the first front-environment recognizer, a target position on the basis of the preceding vehicle, and executing a first brake control based on the target position; and a second brake controller determining, when the preceding vehicle is recognized only by the second front-environment recognizer, the target position on the basis of the preceding vehicle, and determining a corrected target position by correcting the target position, and executing a second brake control based on the corrected target position in advance of the first brake control. The corrected target position is farther from the own vehicle than the target position is.

8 Claims, 10 Drawing Sheets

| WEATHER | CLEAR | RAINY | SNOWY | FOGGY |
|---|---|---|---|---|
| EVALUATION VALUE | 1.0 | 0.5 | 0.5 | 0.4 |

| ROAD SURFACE | DRY | WITH SNOW |
|---|---|---|
| EVALUATION VALUE | 1.0 | 0.5 |

| PERIOD OF TIME | SUNRISE TO SUNSET | SUNSET TO SUNRISE |
|---|---|---|
| EVALUATION VALUE | 1.0 | 0.5 |

VEHICLE DRIVE-ASSIST APPARATUS

CROSS-REFERENCE TO RELATED APPLICATIONS

The present application claims priority from Japanese Patent Application No. 2018-112850 filed on Jun. 13, 2018, the entire contents of which are hereby incorporated by reference.

BACKGROUND

The technology relate to a vehicle drive-assist apparatus that assists driving of a vehicle.

Various drive-assist techniques for a vehicle, such as an automobile, have been proposed and put to practical use to reduce a burden on a driver of the vehicle to achieve safe and comfortable driving.

Some drive-assist apparatuses cause an autonomous sensor, such as a vehicle-mounted camera or Lidar, to acquire information on an external environment outside of the vehicle, and recognize objects, such as a preceding vehicle, on the basis of the information acquired. Such drive-assist apparatuses allow an own vehicle to travel following the preceding vehicle.

The autonomous sensor sometimes has difficulty in detecting a preceding vehicle. For example, it is difficult for the autonomous sensor to detect a preceding vehicle positioned at the tail end of a traffic jam in a curve zone in front of the own vehicle. Japanese Unexamined Patent Application Publication (JP-A) No. 2001-101599, for example, discloses a drive-assist apparatus that communicates with an external device, such as an infrastructure on a road, to preliminarily acquire information that is difficult to be detected by the autonomous sensor. This allows for early alarm notification and smooth deceleration of the own vehicle upon detection of an object.

SUMMARY

An aspect of the technology provides a vehicle drive-assist apparatus including a first front-environment recognizer configured to recognize, with an autonomous sensor mounted on an own vehicle, a front environment in front of the own vehicle traveling on a traveling course; a second front-environment recognizer configured to recognize the front environment on a basis of information received from an external device outside the own vehicle via external communication; a first brake controller configured to determine, when a preceding vehicle is recognized by the first front-environment recognizer, a target position on a basis of the preceding vehicle, and execute a first brake control based on the target position; and a second brake controller configured to determine, when the preceding vehicle is not recognized by the first front-environment recognizer and is recognized by the second front-environment recognizer, the target position on a basis of the preceding vehicle, determine a corrected target position by correcting the target position, and execute a second brake control based on the corrected target position until the preceding vehicle is recognized by the first front-environment recognizer. The corrected target position is shifted farther from the own vehicle than the target position is.

An aspect of the technology provides a vehicle drive-assist apparatus including circuitry configured to perform a first front-environment recognition to recognize, with an autonomous sensor mounted on an own vehicle, a front environment in front of the own vehicle traveling on a traveling course; perform a second front-environment recognition to recognize the front environment on the basis of information received from an external device outside the own vehicle via external communication; determine, when a preceding vehicle is recognized by the first front-environment recognition, a target position on the basis of the preceding vehicle, and execute a first brake control based on the target position; and determine, when the preceding vehicle is not recognized by the first front-environment recognition and is recognized by the second front-environment recognition, the target position on the basis of the preceding vehicle, determine a corrected target position by correcting the target position, and execute a second brake control based on the corrected target position until the preceding vehicle is recognized by the first front-environment recognition. The corrected target position is shifted farther from the own vehicle than the target position is.

BRIEF DESCRIPTION OF THE DRAWINGS

The accompanying drawings are included to provide a further understanding of the disclosure and are incorporated in and constitute a part of this specification. The drawings illustrate example implementations and, together with the specification, serve to explain the principles of the disclosure.

DETAILED DESCRIPTION

Figure 1:
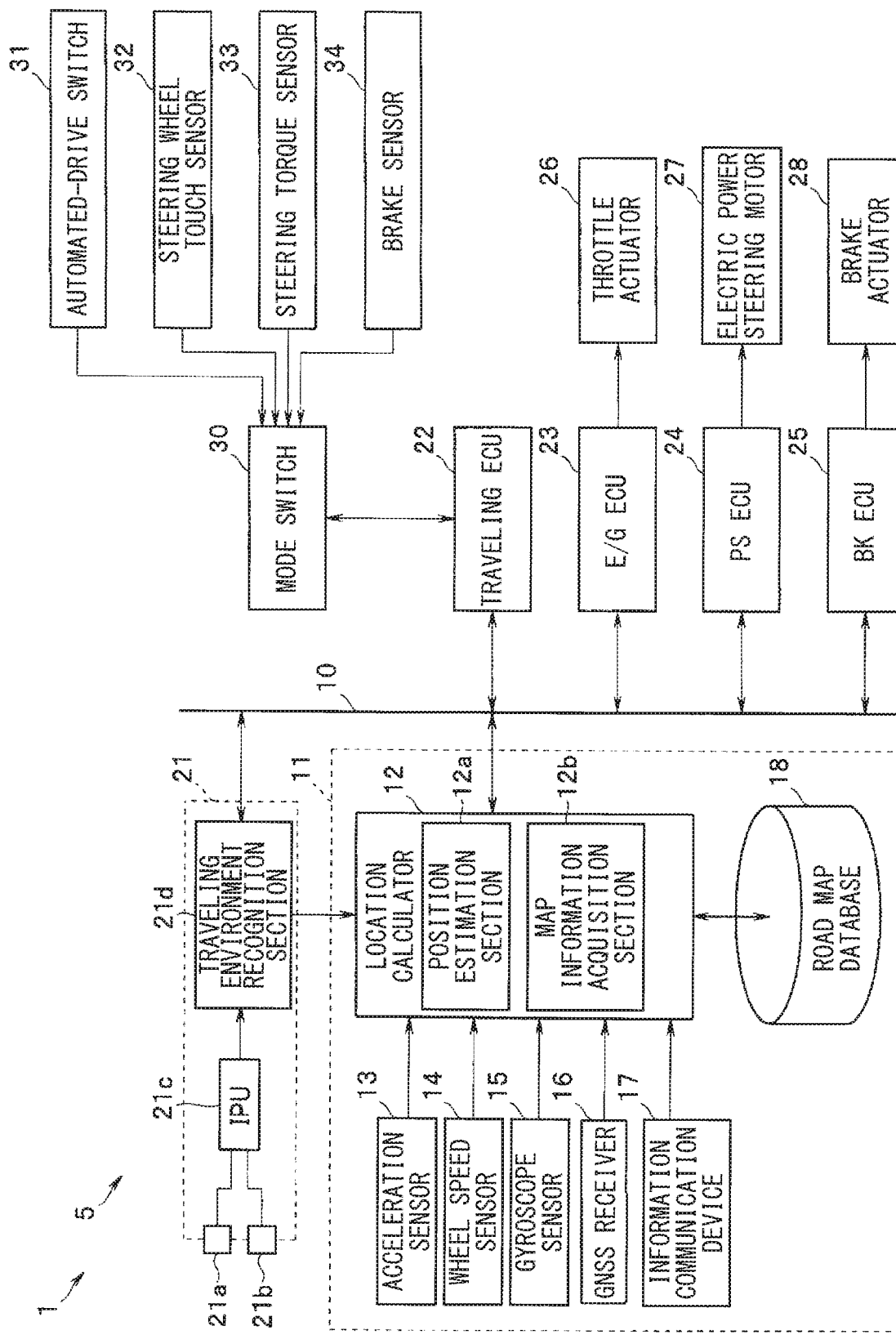
FIG. 1 is a schematic diagram of a drive-assist apparatus having an example configuration according to one example implementation of the technology.

In the following, some implementations of the technology are described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A technique has been recently examined that performs a preliminary automated brake control as well as an alarm control before a preceding vehicle is detected by an autonomous sensor. The preliminary automated brake control is executed on the basis of information on an object, such as the preceding vehicle, acquired through external communication with an external device such as an infrastructure.

In general, the information on the preceding vehicle acquired through the external communication (hereinafter referred to as "external communication information") is inferior in precision to information on the preceding vehicle acquired by the autonomous sensor (hereinafter referred to as "autonomous-sensor information"). Detection based on the external communication information can result in a large error about an actual position and an actual traveling speed of the preceding vehicle.

For example, in a condition where the preceding vehicle recognized on the basis of the external communication information is positioned backward from the actual position of the preceding vehicle (i.e., closer to the own vehicle than the actual position of the preceding vehicle is), and where an automated brake control is performed on the basis of the preceding vehicle, excess deceleration can be caused when the preceding vehicle is recognized on the basis of the autonomous-sensor information. Additionally, after the excess deceleration, unnecessary acceleration and deceleration can be caused at the timing when the automated brake control based on the preceding vehicle recognized on the basis of the external communication information is switched to the automated brake control based on the preceding vehicle recognized on the basis of the autonomous-sensor information. For example, the own vehicle is once accelerated after the excess deceleration and decelerated again after the acceleration. This can cause a feeling of strangeness of the driver.

It is desirable to provide a vehicle drive-assist apparatus that achieves appropriate deceleration without causing a feeling of strangeness of a driver.

Figure 2:
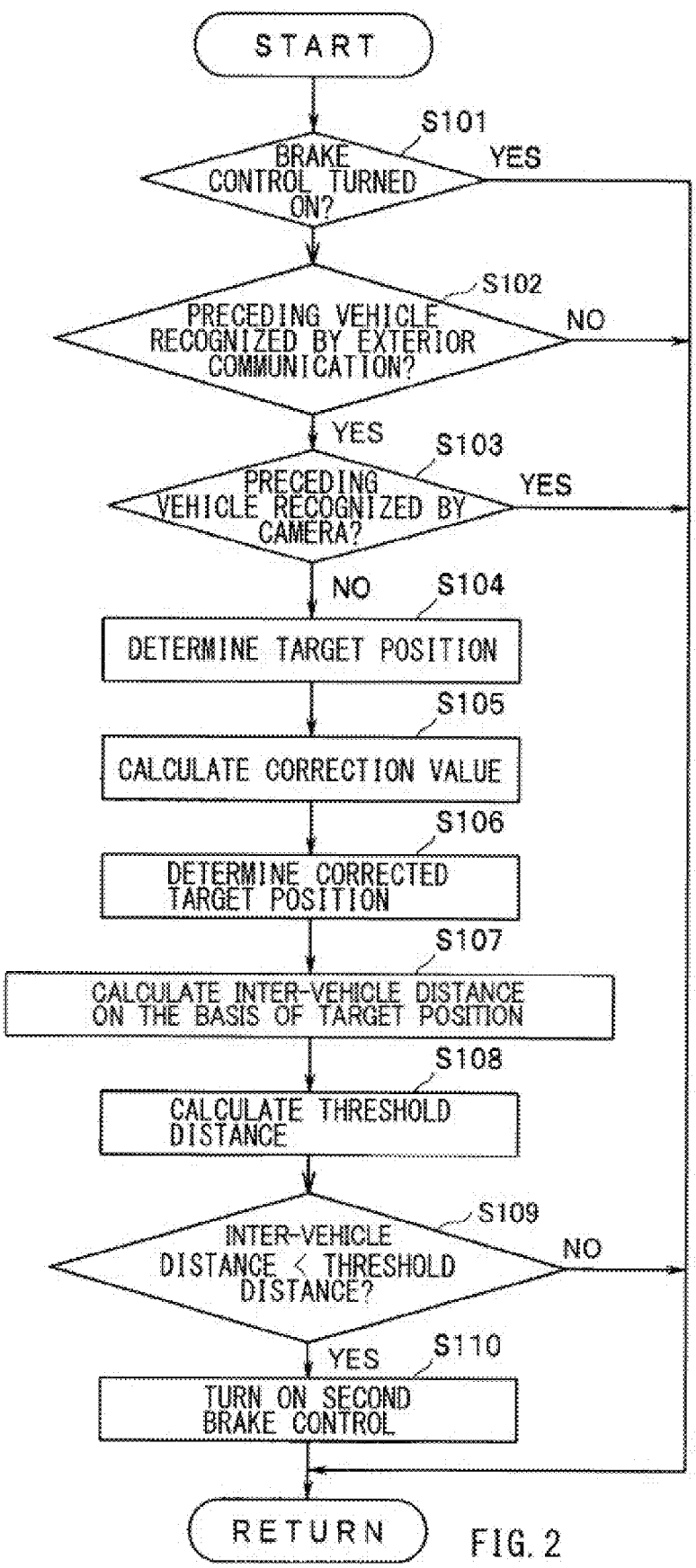
FIG. 2 is a flowchart illustrating an example routine for determining whether a second brake control is to be executed.
Figure 3:
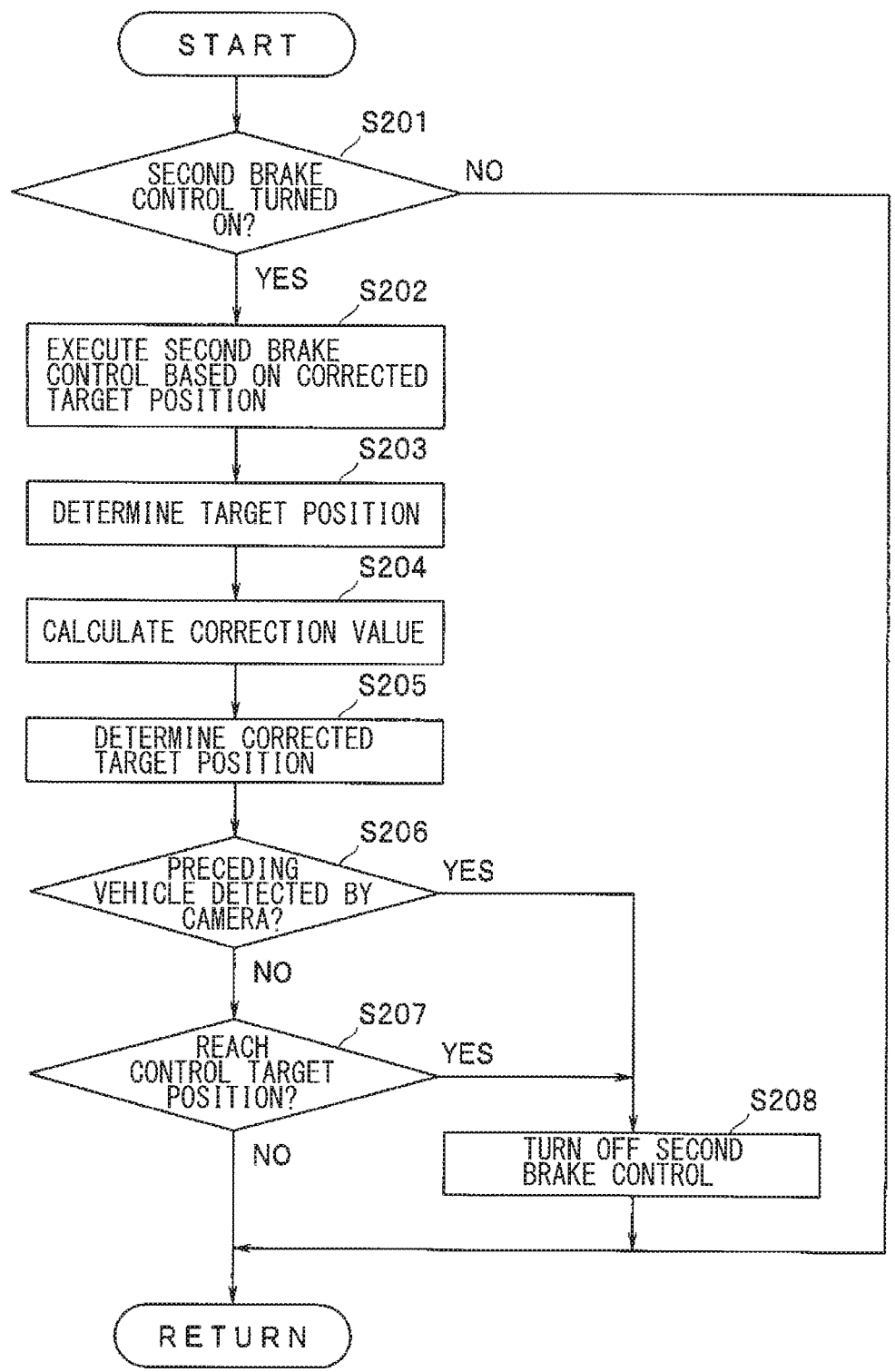
FIG. 3 is a flowchart illustrating an example routine of the second brake control.
Figure 4:
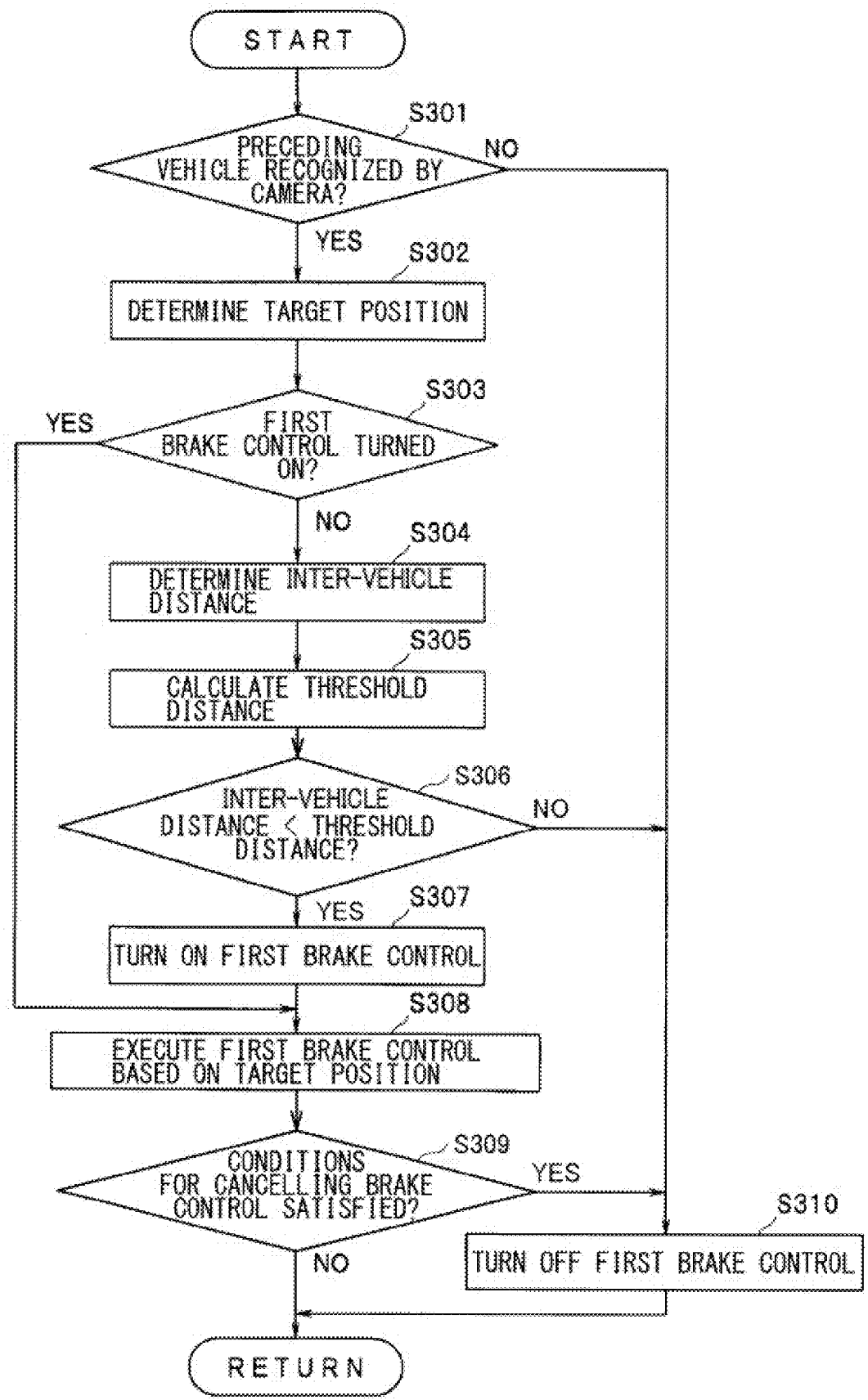
FIG. 4 is a flowchart illustrating an example routine of a first brake control.
Figures 5, 6, 7, 8:
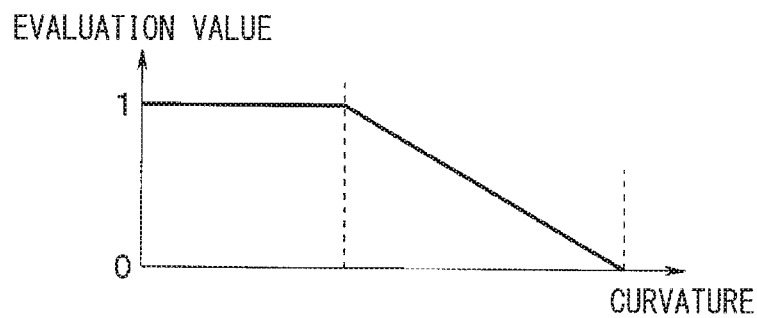
FIG. 5 is tabular map of an example evaluation value based on the weather.
FIG. 6 is a tabular map of an example evaluation value based on a road-surface condition.
FIG. 7 is a tabular map of an example evaluation value based on a period of time.
FIG. 8 is a graph illustrating an example evaluation value based on the curvature of a curve.
Figure 9:
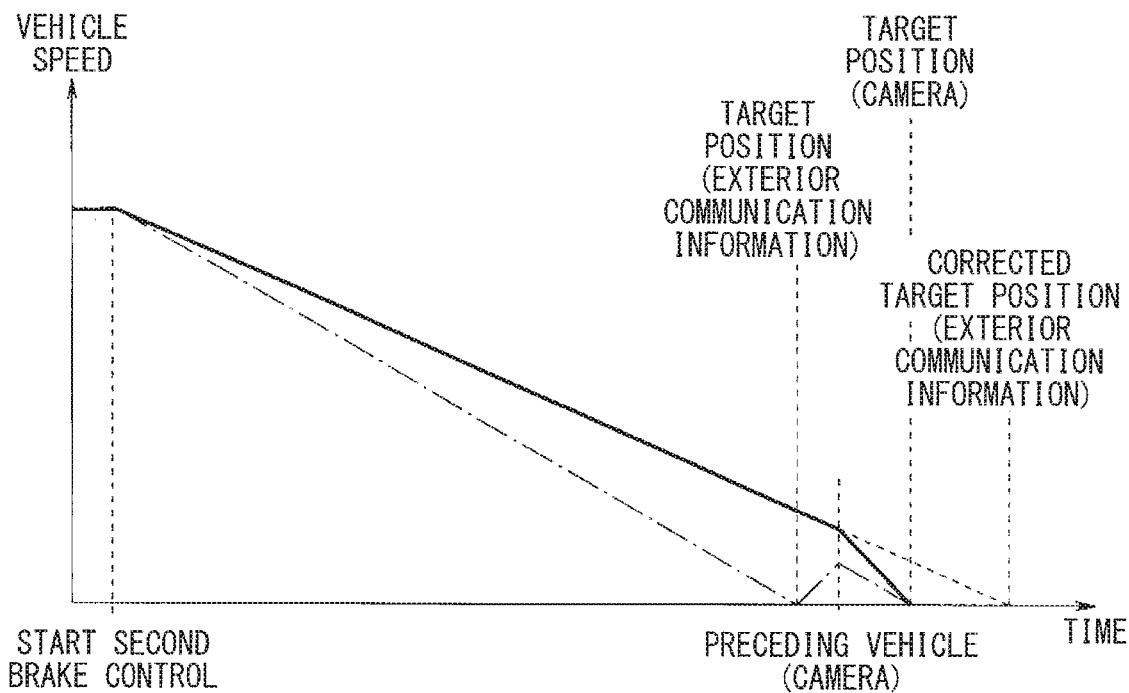
FIG. 9 is a graph illustrating an example operation of an automated brake control to be executed when a target position determined on the basis of external communication information is closer to an own vehicle than a target position recognized by a camera unit is.
Figure 10:
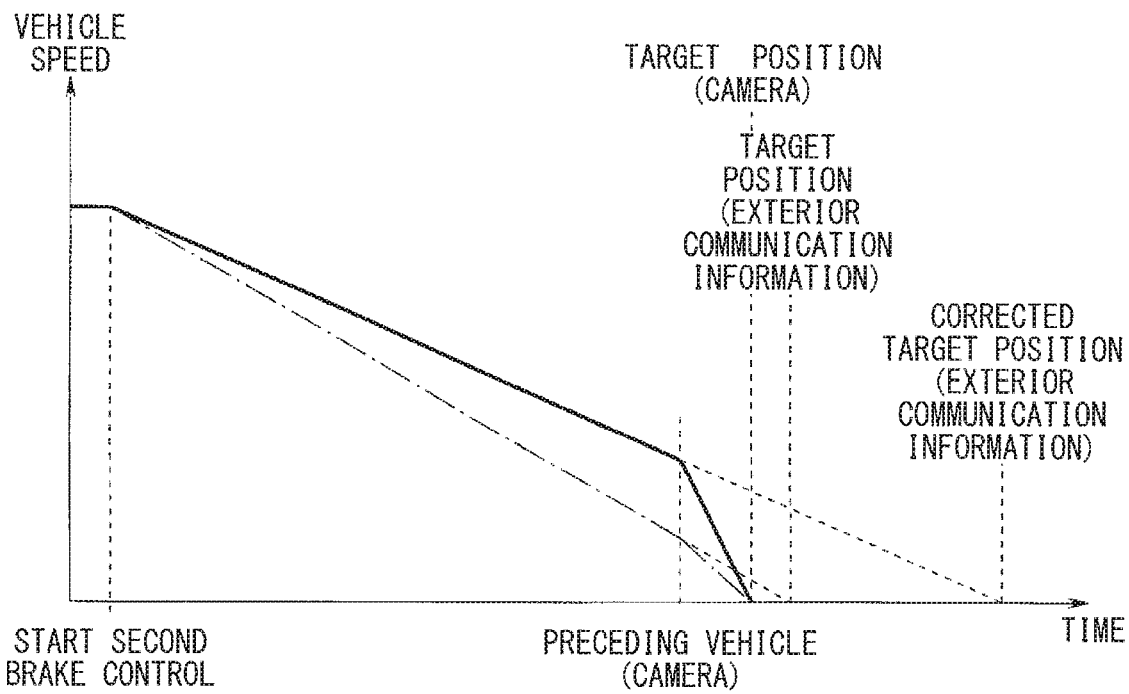
FIG. 10 is a graph illustrating an example operation of an automated brake control to be executed when the target position determined on the basis of the external communication information is farther from the the own vehicle than the target position recognized by the camera unit is.
Figure 11:
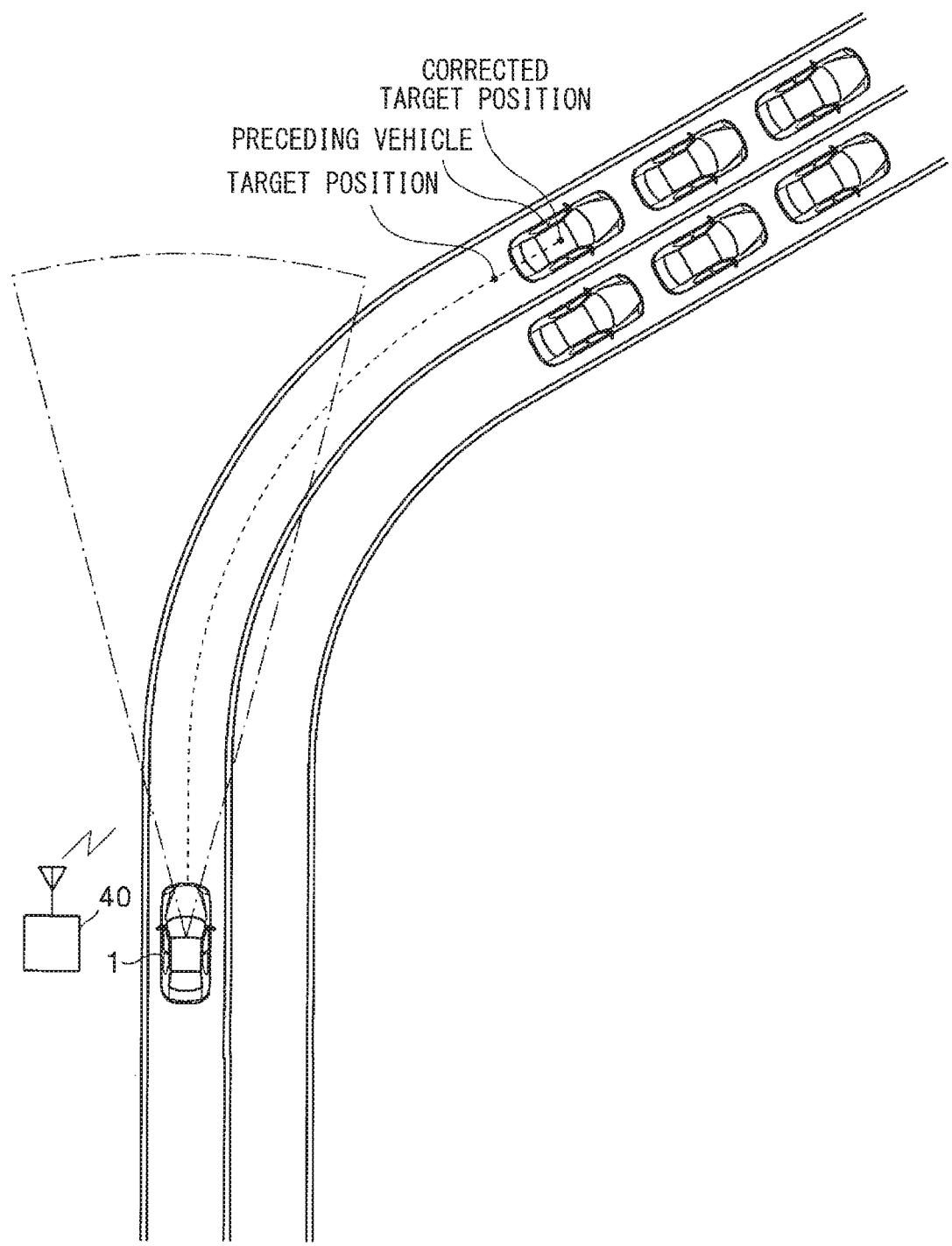
FIG. 11 is a diagram illustrating an example relation between the own vehicle and a preceding vehicle before the preceding vehicle is recognized by the camera unit.
Figure 12:
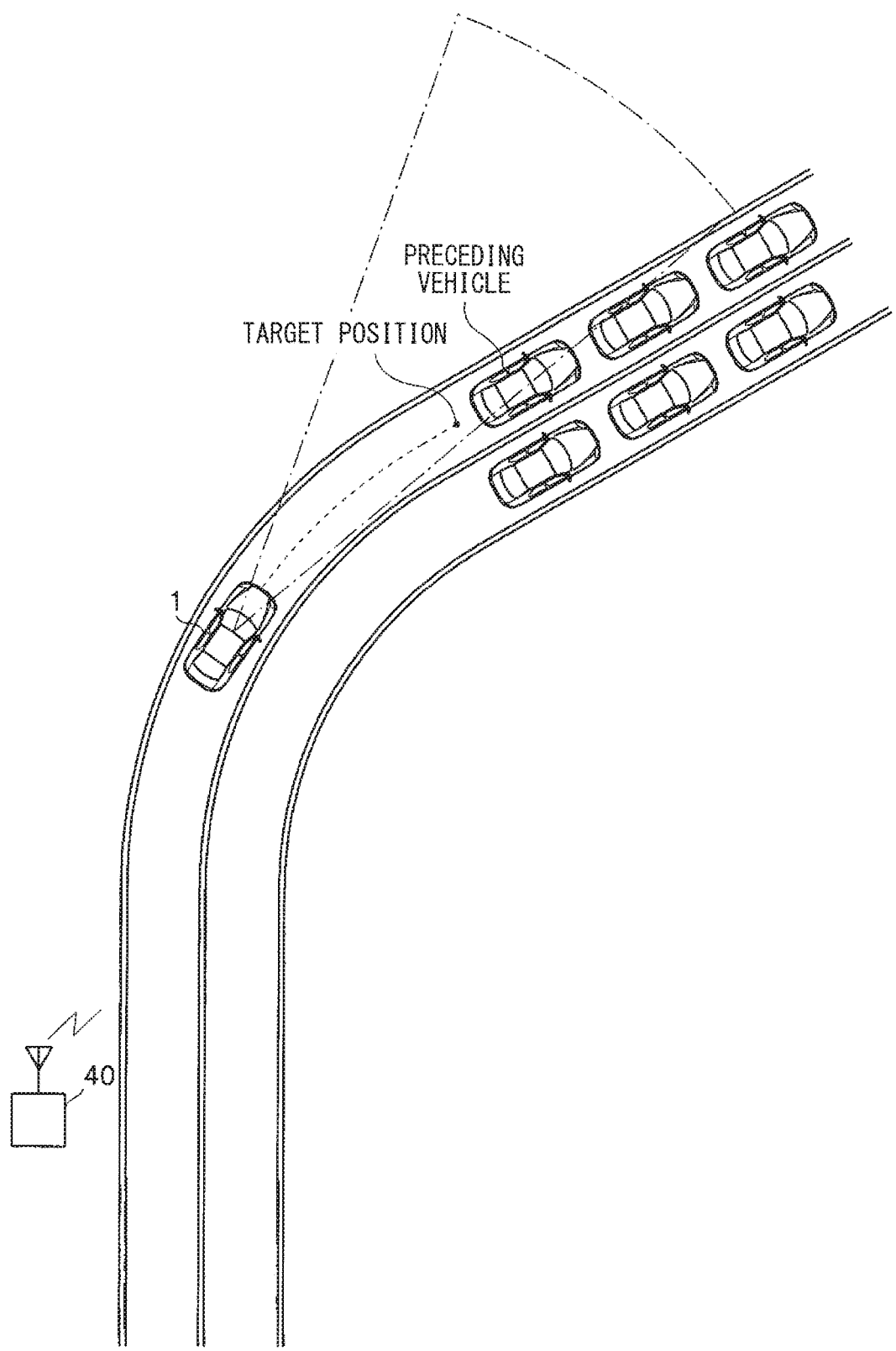
FIG. 12 is a diagram illustrating an example relation between the own vehicle and the preceding vehicle when the preceding vehicle is recognized by the camera unit.

FIG. 1 schematically illustrates an example configuration of an own vehicle 1 provided with a drive-assist apparatus according to an example implementation of the technology. FIG. 2 is a flowchart illustrating an example routine for determining whether a second brake control is to be executed. FIG. 3 is a flowchart illustrating an example routine of the second brake control. FIG. 4 is a flowchart illustrating an example routine of the first brake control. FIG. 5 is a tabular map of an example evaluation value based on the weather. FIG. 6 is a tabular map of an example evaluation value based on a road-surface condition. FIG. 7 is a tabular map of an example evaluation value based on a period of time. FIG. 8 is a graph illustrating an example evaluation value based on the curvature of a curve. FIG. 9 is a graph illustrating an example operation of an automated brake control to be executed when a target position determined on the basis of the external communication information is closer to an own vehicle 1 than a target position recognized by a camera unit is. FIG. 10 is a graph illustrating an example operation of an automated brake control to be executed when the target position determined on the basis of the external communication information is farther from the own vehicle 1 than the target position recognized by the camera unit is. FIG. 11 is a diagram illustrating an example relation between the own vehicle and a preceding vehicle before the preceding vehicle is recognized by a camera unit. FIG. 12 is a diagram illustrating an example relation between the own vehicle and a preceding vehicle when the preceding vehicle is recognized by the camera unit.

A drive-assist apparatus 5 illustrated in FIG. 1 may be mounted on the own vehicle 1. The own vehicle 1 may be an automobile, for example. The drive-assist apparatus 5 may include external environment recognizing units or sensor units that recognize an external environment in which the own vehicle 1 is traveling. The external environment recognizing units or sensor units may include a locator unit 11 and a camera unit 21. The locator unit 11 and the camera unit 21 of the drive-assist apparatus 5 may respectively serve as multiplex systems that operate independently from each other. The drive-assist apparatus 5 may further include a traveling control unit (hereinafter referred to as a "traveling ECU") 22, an engine control unit (hereinafter referred to as an "E/G ECU") 23, a power steering control unit (hereinafter referred to as a "PS ECU") 24, and a brake control unit (hereinafter referred to as a "BK ECU") 25. In one implementation, the traveling ECU 22 may serve as a "first brake controller" and a "second brake controller". The traveling ECU 22, the E/G ECU 23, the PS ECU 24, the BK ECU 25, the locator unit 11, and the camera unit 21 may be coupled to one another through a vehicle communication line 10 via a controller area network (CAN), for example.

The locator unit 11 may estimate a position of the own vehicle 1 on a road map. The locator unit 11 may include a location calculator 12 and a road map database 18. The location calculator 12 may estimate a position of the own vehicle 1, for example. The road map database 18 may store high-definition data.

The location calculator 12 may have an input terminal coupled to some sensors that are used for estimation of a position of the own vehicle 1. Specific but non-limiting examples of the sensors may include an acceleration rate sensor 13, a wheel speed sensor 14, a gyroscope sensor 15, and a global navigation satellite system (GNSS) receiver 16. The acceleration rate sensor 13 may detect forward and backward acceleration rates exerted on the own vehicle 1. The wheel speed sensor 14 may detect a rotary speed of right and left wheels at the front and the rear of the own vehicle 1. The gyroscope sensor 15 may detect an angular speed or an angular acceleration rate of the own vehicle 1. The GNSS receiver 16 may receive positioning signals from a plurality of positioning satellites.

The input terminal of the location calculator 12 may also be coupled to an information communication device 17 that establishes wireless communication (herein also referred to as "external communication") between the own vehicle 1 and an external device outside the own vehicle 1.

For example, the information communication device 17 may establish wireless communication between the own vehicle 1 and an infrastructure equipment 40 (illustrated in FIGS. 11 and 12) disposed on a side of the road to acquire the external communication information that includes regulatory information and traffic jam information on the road, for example. Additionally, the information communication device 17 may establish wireless communication between the own vehicle 1 and another vehicle around the own vehicle 1 to acquire vehicle information on a position and a speed of the other vehicle and information on an external environment recognized by an external environment recognizer of the other vehicle, for example.

The location calculator 12 may also receive information from the road map database 18. The road map database 18 may be stored in a mass storage medium, such as a hard disk drive (HDD), and include high-definition road map data or a dynamic map. The high-definition road map data may include lane data necessary for execution of automated driving. The lane data may include a width of a lane line, a coordinate of a middle of the lane, a traveling azimuth of the lane, and a speed limit, for example. The lane data may be allocated to respective regions of the lane on the road map. The respective regions of the lane may extend along the lane at several meter intervals.

The location calculator 12 may include a position estimation section 12a that estimates a position of the own vehicle 1, and a map information acquisition section 12b that acquires route map information.

The map information acquisition section 12b may retrieve route map information from the map information stored in the road map database 18 on the basis of a destination set by the driver before the automated driving is started. The route map information may include the lane data on a route from a current location to the destination. Thereafter, the map information acquisition section 12b may transmit the acquired route map information to the position estimation section 12a. The position estimation section 12a may acquire a positional coordinate of the own vehicle 1 on the basis of the positioning signals received at the GNSS receiver 16, and perform map-matching of the positional coordinate on the route map. The position estimation section 12a may thereby estimate the position of the own vehicle 1 on the road map, identify the lane on which the own vehicle 1 is traveling, and retrieve, from the road map database 18, the curvature of a middle of the lane on which the own vehicle 1 is traveling.

While the own vehicle 1 is traveling in an environment, such as a region in a tunnel, where the position estimation section 12a has difficulty in receiving effective signals from the positional satellites due to decreased sensitivity of the GNSS receiver 16, the position estimation section 12a may switch the satellite navigation to autonomous navigation in order to estimate the position of the own vehicle 1 on the road map. In the autonomous navigation, the position of the own vehicle 1 may be estimated on the basis of the vehicle speed calculated from the wheel speed detected by the wheel speed sensor 14, the angular speed detected by the gyroscope sensor 15, the forward or backward acceleration rate detected by the acceleration rate sensor 13.

In addition to estimating the position of the own vehicle 1, the position estimation section 12a may recognize a front environment in front of the own vehicle 1 traveling on a traveling course (hereinafter referred to as "front environment of the traveling course") on the basis of the information transmitted from the external device to the information communication device 17.

The information on the front environment of the traveling course recognized by the position estimation section 12a may include data on a preceding vehicle ahead of the own vehicle 1 traveling on the traveling course, for example. In other words, the position estimation section 12a may acquire various pieces of information on presence of the preceding vehicle traveling of the own vehicle 1 traveling on the traveling course, a position of the preceding vehicle on the road map, and a relative speed between the preceding vehicle and the own vehicle 1, on the basis of one or both of the information from the infrastructure equipment 40 and the information from the other vehicle, for example. In addition, when there is a traffic jam ahead of the own vehicle 1 traveling on the traveling course, the position estimation section 12a may determine whether the preceding vehicle is positioned at the tail end of the traffic jam.

In one implementation, the position estimation section 12a may serve as a "second front-environment recognizer" that recognizes the information on the front environment of the traveling course on the basis of the information transmitted from the external device outside the own vehicle 1 to the information communication device 17 via the external communication, as described above.

The camera unit 21 may be fixed on an upper central portion of a front interior side of the own vehicle 1. The camera unit 21 may include a vehicle-mounted camera, an image processor (IPU) 21c, and a traveling environment recognition section 21d. The vehicle-mounted camera may be a stereo camera that includes a main camera 21a and a subsidiary camera 21b disposed on respective positions bilaterally symmetric to each other about a line extending through a middle of the width of the own vehicle 1.

The IPU 21c may perform a predetermined image processing on the basis of information on the front environment of the traveling course acquired by the main camera 21a and the subsidiary camera 21b, to generate a front traveling environment image information (hereinafter also referred to as "distance image information") that includes distance data. The distance data may be determined from a position gap between the position of one target object in the image information acquired by the main camera 21a and the position of the same target object on the image information acquired by the subsidiary camera 21b.

The traveling environment recognition section 21d may determine the curvature [1/m] of each of right and left lane lines that define the traveling course on which the own vehicle 1 is traveling (hereinafter simply referred to as "traveling course of the own vehicle 1"), and the width of the lane defined between the right and left lane lines (hereinafter simply referred to as "lane width"), on the basis of the distance image information received from the IPU 21c, for example. Various techniques have been known for determining the curvature of the lane lines and the lane width. For example, the traveling environment recognition section 21d may calculate the curvatures of the right and left lane lines on a predetermined section basis by recognizing the right and left lane lines through binarization based on the front traveling environment image information using a luminance difference, and performing approximation of the right and left lane lines by a least squares method. In addition, the traveling environment recognition section 21*d* may calculate the lane width on the basis of a difference between the curvatures of the right and left lanes.

Thereafter, the traveling environment recognition section 21*d* may calculate the curvature of the middle of the lane (hereinafter referred to as a "camera curvature") on the basis of the curvatures of the right and left lane lines and the lane width, for example. In addition, the traveling environment recognition section 21*d* may calculate a deviation of the lateral position of the own vehicle 1 with respect to the middle of the lane (hereinafter simply referred to as a "lateral position difference Xdiff"). The lateral position difference Xdiff may correspond to a distance from the middle of the lane to the middle of the width of the own vehicle 1.

The traveling environment recognition section 21*d* may further perform predetermined pattern matching of the distance image information to recognize a three-dimensional object, such as a guard rail or a curbstone, that extends along the road. Upon recognizing the the three-dimensional object, the traveling environment recognition section 21*d* may recognize the type of the three-dimensional object, the distance from the own vehicle 1 to the three-dimensional object, the speed of the three-dimensional object, and a relative speed between the three-dimensional object and the own vehicle 1, for example. The traveling environment recognition section 21*d* may thereby generate three-dimensional object information.

When the three-dimensional object recognized by the traveling environment recognition section 21*d* is a vehicle present ahead of the own vehicle 1 traveling on the traveling course, the traveling environment recognition section 21*d* may identify the vehicle to be a preceding vehicle and acquire various pieces of information on the position of the preceding vehicle traveling on the traveling course and a relative speed between the own vehicle 1 and the preceding vehicle, for example.

In one implementation, the traveling environment recognition section 21*d* may serve as a "first front-environment recognizer" that recognizes, with the autonomous sensors mounted on the own vehicle 1, the front environment of the traveling course, as described above.

The position of the own vehicle 1 estimated by the position estimation section 12*a* of the location calculator 12, the lateral difference Xdiff of the own vehicle 1, the information on the three-dimensional objects that are determined by the traveling environment recognition section 21*d* of the camera unit 21, and other pieces of information necessary for execution of automated driving may be read by the traveling ECU 22.

The traveling ECU 22 may perform three operation modes including a manual operation mode, a first drive-assist mode, and a second drive-assist mode.

The manual operation mode may cause the own vehicle 1 to travel in accordance with a driving operation, such as steering, accelerating, or braking operation by the driver.

In the first and second drive-assist modes, the traveling ECU 22 may cause the E/G ECU 23, the PS ECU 24, and the BK ECU 25, for example, to perform an adaptive cruise control in parallel to a lane keep assist control or a lane departure prevention control, and thereby causing the own vehicle 1 to automatically travel (i.e., to achieve automated driving) along a target traveling course. Note that the adaptive cruise control may cause the own vehicle 1 to travel following the preceding vehicle. The lane keep assist control may cause the own vehicle 1 to keep traveling in the same lane. The lane departure prevention control may prevent the own vehicle 1 from deviating from the lane on which the own vehicle 1 is currently traveling.

For example, when the traveling environment recognition section 21*d* recognizes a preceding vehicle ahead of the own vehicle 1 traveling on the traveling course in the first and second drive-assist modes, the traveling ECU 22 may determine a target traveling course on the basis of a traveling track of the preceding vehicle to cause the own vehicle 1 to automatically travel (i.e., to achieve automated traveling) along the target traveling course following the preceding vehicle without deviating from the lane. When the traveling environment recognition section 21*d* does not recognize a preceding vehicle in the first and second drive-assist modes, the traveling ECU 22 may determine a target traveling course on the basis of the traveling course of the own vehicle 1 to cause the own vehicle 1 to automatically travel along the target traveling course at a target vehicle speed. The target vehicle speed may be set by the driver.

The first and second drive-assist modes may be basically similar to each other in that these modes achieve the automated driving of the own vehicle 1 as described above. However, the first and second drive-assist modes may be different from each other in that the first drive-assist mode requires a steering operation by the driver (i.e., the driver needs to hold the steering wheel in the first drive-assist mode), whereas the second drive-assist mode requires no steering operation by the driver. In a case where the target traveling course is difficult to be determined, for example, the second drive-assist mode may switch the automated driving to manual driving by the driver (i.e., the second drive-assist mode may be switched to the manual operation mode) or cause the own vehicle 1 to automatically stop in a side zone of the road.

These operation modes performed by the traveling ECU 22 may be selectively executed in response to a switching signal from a mode switch 30.

The mode switch 30 may receive, from the traveling ECU 22, various pieces of information on the traveling course of the own vehicle 1 estimated by the camera unit 21, and various pieces of information on the position of the own vehicle 1 on the road map estimated by the locator unit 11, for example. The information on the traveling course of the own vehicle 1 may include the camera curvature and the lateral position difference Xdiff of the own vehicle 1, for example. The mode switch 30 may compare the lateral position of the own vehicle 1 with respect to the middle of the lane estimated by the position estimation section 12*a* with the lateral position of the own vehicle 1 determined by the traveling environment recognition section 21*d* at on a constant basis to determine a difference between these lateral positions of the own vehicle 1. When an absolute value of the difference between the lateral positions of the own vehicle 1 is greater than a predetermined threshold, the mode switch 30 may determine that any one of the lateral position of the own vehicle 1 estimated by the position estimation section 12*a* and the lateral position of the own vehicle 1 determined by the traveling environment recognition section 21*d* has low reliability and that system conditions for the automated driving are not satisfied.

The mode switch 30 may have an input terminal coupled to various switch sensors including an automated-drive switch 31, a steering wheel touch sensor 32, a steering torque sensor 33, and a brake sensor 34. The automated-drive switch 31 may be operated by the driver to perform an on/off switching of the automated driving (i.e., drive-assist control). The steering wheel touch sensor 32 may be turned on when the driver holds the steering wheel. The steering torque sensor 33 may detect the steering torque exerted by a driver's driving operation. The brake sensor 34 may detect the amount of depression of a brake pedal exerted by a driver's driving operation.

On the basis of the result of the determination whether the system conditions are satisfied and the information received from the various switch sensors described above, the mode switch 30 may switch between the operation modes to be executed in the traveling ECU 22.

The E/G ECU 23 may have an output terminal coupled to a throttle actuator 26. The throttle actuator 26 may open and close a throttle valve of an electronic control throttle device disposed on a throttle body of an engine. The throttle valve may be opened or closed in response to a driving signal from the E/G ECU 23 to regulate an intake air flow. This helps generate an engine output at a desired level.

The PS ECU 24 may have an output terminal coupled to an electric power steering motor 27. The electric power steering motor 27 may impart a steering torque to a steering mechanism using a rotary power of the motor. For the automated driving, the electric power steering motor 27 may be driven in response to a driving signal from the PS ECU 24 to execute the lane keep assist control that causes the own vehicle 1 to keep traveling in the same lane and a lane change assist control that causes the own vehicle 1 to move to an adjacent lane for passing, for example.

The BK ECU 25 may have an output terminal coupled to a brake actuator 28. The brake actuator 28 may regulate a brake hydraulic pressure to be applied to a brake wheel cylinder of each of the wheels. When the brake actuator 28 is driven in response to a driving signal from the BK ECU 25, the brake wheel cylinder of each of the wheels may generate a brake force, which forcibly decelerates the own vehicle 1.

As part of the drive-assist control in the automated driving, the traveling ECU 22 in the drive-assist apparatus 5 may cause the E/G ECU 23 to perform an engine brake control based on the preceding vehicle, and cause the BK ECU 25 to perform an automated brake control based on the preceding vehicle. For example, the E/G ECU 23 may cause the throttle actuator 26 to perform the engine brake control, and the BK ECU 25 may cause the brake actuator 28 to perform the automated brake control.

Basically, the automated brake control may be achieved through a first brake control based on a preceding vehicle recognized by the traveling environment recognition section 21d.

For example, when the traveling environment recognition section 21d recognizes a preceding vehicle ahead of the own vehicle 1 traveling on the traveling course, the traveling ECU 22 determines a target position on the basis of the preceding vehicle, and executes the first brake control based on the target position. In this case, the target position may be shifted backward from the position of the preceding vehicle currently recognized (i.e., closer to the own vehicle 1 than the position of the preceding vehicle currently recognized is) by a predetermined distance long enough to ensure safe stopping of the own vehicle 1.

In contrast, when it is difficult for the traveling environment recognition section 21d to recognize, with the autonomous sensor such as the stereo camera, a preceding vehicle through the front-environment recognition, the traveling ECU 22 executes a second brake control based on a preceding vehicle recognized by the position estimation section 12a.

In other words, when the preceding vehicle is not recognized by the traveling environment recognition section 21d and is recognized by the position estimation section 12a, the traveling ECU 22 executes, in advance of the first brake control, a preliminary brake control (i.e., the second brake control) based on the preceding vehicle recognized by the position estimation section 12a. The traveling ECU 22 executes the second brake control until the traveling environment recognition section 21d recognizes the preceding vehicle.

For example, when a preceding vehicle is recognized ahead of the own vehicle 1 traveling on the traveling course by the position estimation section 12a, the traveling ECU 22 may determine a target position on the basis of the preceding vehicle, and determine a corrected target position by correcting the target position using a predetermined correction value. The corrected target position may be shifted farther from the own vehicle 1 than the target position before the correction is. Thereafter, the traveling ECU 22 may execute the second brake control based on the corrected target position.

As described in the example implementation, the first brake control and the second brake control may be achieved by the traveling ECU 22, the E/G ECU 23, and the BK ECU 25, for example. In other words, the traveling ECU 22 may serve as the "first brake controller" and the "second brake controller".

In the following, an example routine for determining whether the second brake control is to be executed by the traveling ECU 22 is described with reference to FIG. 2. The routine may be repeated every predetermined time period. Once the routine starts, the traveling ECU 22 may first determine whether the brake control is turned on in Step S101. In other words, the traveling ECU 22 may determine whether any one of the first brake control and the second brake control is turned on in Step S101.

When the traveling ECU 22 determines that the brake control is turned on in Step S101 ("YES" in Step S101), the procedure may exit the routine.

When the traveling ECU 22 determines that the brake control is turned off in Step S101 ("NO" in Step S101), the procedure may proceed to Step S102.

In Step S102, the traveling ECU 22 may determine whether a preceding vehicle is recognized by the position estimation section 12a on the basis of the external communication information acquired through the information communication device 17.

When the traveling ECU 22 determines that a preceding vehicle is not recognized by the position estimation section 12a in Step S102 ("NO" in Step S102), the procedure may exit the routine.

When the traveling ECU 22 determines that a preceding vehicle is recognized by the position estimation section 12a in Step S102 ("YES" in Step S102), the procedure may proceed to Step S103.

In Step S103, the traveling ECU 22 may determine whether the preceding vehicle is recognized by the traveling environment recognition section 21d on the basis of the information from the vehicle-mounted camera.

When the traveling ECU 22 determines that the preceding vehicle is recognized by the traveling environment recognition section 21d in Step S103 ("YES" in Step S103), the procedure may exit the routine.

When the traveling ECU 22 determines that the preceding vehicle is not recognized by the traveling environment recognition section 21d and is recognized by the position estimation section 12a in Step S103 ("NO" in Step S103), the procedure may proceed to Step S104.

In Step S104, the traveling ECU 22 may determine a target position for the brake control. Referring to FIG. 11, the target position may be shifted backward from the position of the preceding vehicle recognized by the position estimation section 12a (i.e., closer to the own vehicle 1 than the position of the preceding vehicle recognized by the position estimation section 12a is) by a predetermined distance long enough to ensure safe stopping of the own vehicle 1.

Thereafter, in Step S105, the traveling ECU 22 may calculate a correction value with which the target position is to be corrected. The correction value may be calculated by the following Expression 1, for example:

Correction Value=Base Value×(Evaluation Value 1+Evaluation Value 2+ . . . +Evaluation Value N)/N   Expression 1 where Evaluation values 1 to N represent values variable in accordance with various traveling conditions of the own vehicle 1.

Specific but non-limiting examples of the evaluation values determined by the traveling ECU 22 may include an evaluation value variable in accordance with the weather, as illustrated in FIG. 5, for example. The traveling ECU 22 may determine the weather-based evaluation value on the basis of a predetermined map, for example. The weather-based evaluation value may be smaller when the weather is not a clear weather than when the weather is the clear weather. In this example, the weather may be determined in comprehensive view of the external communication information acquired through the information communication device 17, the operation state of a windshield wiper, and the front environment recognized by the traveling environment recognition section 21d, for example.

Another specific but non-limiting example of the evaluation values may include an evaluation value variable in accordance with a condition of the road surface. The evaluation value based on the road-surface condition may be smaller when the road surface includes snow than when the road surface is a dry road surface. In this example, the road-surface condition may be determined in comprehensive view of the external communication information acquired through the information communication device 17 and the front environment recognized by the traveling environment recognition section 21d, for example.

Still another specific but non-limiting example of the evaluation values may include an evaluation value variable in accordance with a period of time. The evaluation value based on the period of time may be smaller from sunset to sunrise than from sunrise to sunset. In this example, the period of time may be determined in view of the external communication information acquired through the information communication device 17, for example.

Yet another specific but non-limiting examples of the evaluation values may include an evaluation value variable in accordance with the curvature of the road in front of the own vehicle 1 traveling on the traveling course. The evaluation value based on the road curvature may be reduced as the road curvature increases. In this example, the road curvature may be determined on the basis of the map information read from the road map database 18 by the map information acquisition section 12b, for example.

Thereafter, in Step S106, the traveling ECU 22 may determine a corrected target position by correcting the target position determined in Step S104 using the correction value calculated in Step S105.

For example, in Step S106, the traveling ECU 22 may determine the corrected target position shifted forward from the target position (i.e., farther from the own vehicle 1 than the target position is) by the correction value, as illustrated in FIG. 11.

Thereafter, in Step S107, the traveling ECU 22 may determine an inter-vehicle distance for the second brake control. The inter-vehicle distance may be determined on the basis of the target position calculated in Step S104. The inter-vehicle distance may be used for determining whether the second brake control is to start.

For example, in Step S107, the traveling ECU 22 may calculate a route distance from the own vehicle 1 to the target position as the inter-vehicle distance.

Thereafter, in Step S108, the traveling ECU 22 may calculate a control start distance or threshold distance that is a threshold for the inter-vehicle distance. For example, the traveling ECU 22 may determine the threshold distance on the basis of a relative speed between the own vehicle 1 and the preceding vehicle with refence to a predetermined map.

Thereafter, in Step S109, the traveling ECU 22 may determine whether the inter-vehicle distance is smaller than the threshold distance.

When the traveling ECU 22 determines that the inter-vehicle distance is not smaller than the threshold distance in Step S109 ("NO" in Step S109), the procedure may exit the routine.

When the traveling ECU 22 determines that the inter-vehicle distance is smaller than the threshold distance in Step S109 ("YES" in Step S109), the procedure may proceed to Step S110. In Step S110, the traveling ECU 22 may turn on the second brake control, and thereafter the procedure may exit the routine.

In the following, an example routine of the second brake control executed by the traveling ECU 22 is described with reference to FIG. 3. The routine may be repeated every predetermined time period. Once the routine starts, the traveling ECU 22 may first determine whether the second brake control is turned on in Step S201. In other words, the traveling ECU 22 may determine whether the second brake control is turned on and whether the on-state of the second brake control is maintained in Step S201.

When the traveling ECU 22 determines that the second brake control is turned off in Step S201 ("NO" in Step S201), the procedure may exit the routine.

When the traveling ECU 22 determines that the second brake control is turned on in Step S201 ("YES" in Step S201), the procedure may proceed to Step S202. In Step S202, the traveling ECU 22 may execute the second brake control based on the corrected target position.

For example, as illustrated in FIGS. 9 and 10, the traveling ECU 22 may execute the second brake control that decelerates the own vehicle 1 to a target vehicle speed at a constant deceleration rate. The target vehicle speed may be equal to a current vehicle speed of the preceding vehicle. Through the second brake control, the speed of the own vehicle 1 may become equal to the target vehicle speed at the timing when the own vehicle 1 reaches the corrected target position.

As described above, the second brake control may be based on the corrected target position in place of the target position. Note that FIGS. 9 and 10 each illustrate an example situation in which the preceding vehicle is stopped (i.e., the target vehicle speed is zero) due to a traffic jam, for example.

Thereafter, in Step S203 to Step 205, the traveling ECU 22 may update the current target position and the current corrected target position.

For example, in Step S203, the traveling ECU 22 may determine an updated target position through the same process as in Step S104 described above.

Thereafter, in Step S204, the traveling ECU 22 may calculate an updated correction value through the same process as in Step S105 described above.

Thereafter, in Step S205, the traveling ECU 22 may calculate an updated corrected target position through the same process as in the Step S106 described above.

Thereafter, in Step S206, the traveling ECU 22 may determine whether the preceding vehicle is recognized by the traveling environment recognition section 21d on the basis of the information from the vehicle-mounted camera.

When the traveling ECU 22 determines that the preceding vehicle is recognized by the traveling environment recognition section 21d in Step S206 ("YES" in Step S206), the procedure may proceed to Step S208.

When the traveling ECU 22 determines that the preceding vehicle is not recognized by the traveling environment recognition section 21d in Step S206 ("NO" in Step S206), the procedure may proceed to Step S207.

In Step S207, the traveling ECU 22 may determine whether the own vehicle 1 has reached the target position.

When the traveling ECU 22 determines that the own vehicle 1 has not reached the target position in Step S207 ("NO" in Step S207), the procedure may exit the routine.

When the traveling ECU 22 determines that the own vehicle 1 has reached the target position in Step S207 ("YES" in Step S207), the procedure may proceed to Step S208.

In Step S208, the traveling ECU 22 may turn off the second brake control, and the procedure may exit the routine.

In the following, an example routine of the first brake control executed by the traveling ECU 22 is described with reference to FIG. 4. The routine may be repeated every predetermined time period. Once the routine starts, the traveling ECU 22 may first determine whether the preceding vehicle is recognized by the traveling environment recognition section 21d on the basis of the information from the vehicle-mounted camera in Step S301.

When the traveling ECU 22 determines that the preceding vehicle is not recognized by the traveling environment recognition section 21d in Step S301 ("NO" in Step S301), the procedure may proceed to Step S310.

When the traveling ECU 22 determines that the preceding vehicle is recognized by the traveling environment recognition section 21d in Step S301 ("YES" in Step S301), the procedure may proceed to Step S302. In Step 302, the traveling ECU 22 may calculate a target position on the basis of the preceding vehicle recognized by the traveling environment recognition section 21d, as illustrated in FIG. 12. Note that the target position may be calculated in a similar manner as in Step S104 described above except that the target position may be determined on the basis of the preceding vehicle recognized by traveling environment recognition section 21d rather than the preceding vehicle recognized by the position estimation section 12a in Step 302.

Thereafter, in Step S303, the traveling ECU 22 may determine whether the first brake control is turned on.

When the traveling ECU 22 determines that the first brake control is turned on in Step S303 ("YES" in Step S303), the procedure may proceed to Step S308.

When the traveling ECU 22 determines that the first brake control is turned off in Step S303 ("NO" in Step S303), the procedure may proceed to Step S304. In Step 304, the traveling ECU 22 may calculate the inter-vehicle distance as in Step S107 described above.

Thereafter, in S305, the traveling ECU 22 may calculate the threshold distance as in Step S108 described above.

Thereafter, in Step S306, the traveling ECU 22 may determine whether the inter-vehicle distance is smaller than the threshold distance.

When the traveling ECU 22 determines that the inter-vehicle distance is not smaller than the threshold distance in Step S306 ("NO" in Step S306), the procedure may proceed to Step S310.

When the traveling ECU 22 determines that the inter-vehicle distance is smaller than the threshold distance in Step S306 ("YES" in Step S306), the procedure may proceed to Step S307. In Step S307, the traveling ECU 22 may turn on the first brake control, and thereafter the procedure may proceed to Step S308.

In Step S308, the traveling ECU 22 may execute the first brake control based on the target position.

For example, as illustrated in FIGS. 9 and 10, the traveling ECU 22 may execute the first brake control that decelerates the own vehicle 1 to a target vehicle speed at a constant deceleration rate. The target vehicle speed may be equal to a current vehicle speed of the preceding vehicle. Through the first brake control, the speed of the own vehicle 1 may be equal to the target vehicle speed at the timing when the own vehicle 1 reaches the target position.

Thereafter, in Step S309, the traveling ECU 22 may determine whether conditions for cancelling the first brake control are satisfied. Note that the conditions for cancelling the first brake control may include that the own vehicle 1 has reached the target position, for example.

When the traveling ECU 22 determines that the conditions for cancelling the first brake control are not satisfied in Step S309 ("NO" in Step S309), the procedure may exit the routine.

When the traveling ECU 22 determines that the conditions for cancelling the first brake control are satisfied in Step S309 ("YES" in Step S309), the procedure may proceed to S310.

In Step S310, the traveling ECU 22 may turn off the first brake control when the first brake control is turned on, and the procedure may exit the routine.

According to the foregoing example implementation, when a preceding vehicle is recognized by the traveling environment recognition section 21d on the basis of the information from the camera unit, the drive-assist apparatus 5 determines the target position on the basis of the preceding vehicle and execute the first brake control based on the target position. On the other hand, when the preceding vehicle is not recognized by the traveling environment recognition section 21d and is recognized by the position estimation section 12a on the basis of the external communication information received from the external device outside the own vehicle 1, the drive-assist apparatus 5 determines the target position on the basis of the preceding vehicle, determines the corrected target position by correcting the target position, and executes the second brake control based on the corrected target position until the first brake control starts. The corrected target position is shifted farther from the own vehicle 1 than the target position is. This achieves appropriate deceleration of the own vehicle 1 without causing a feeling of strangeness of the driver even when the automated brake control is started on the basis of the external communication information acquired through the external communication with the external device outside the own vehicle 1.

In other words, when the second brake control is to be executed, the drive-assist apparatus 5 determines the corrected target position by shifting the target position based on the preceding vehicle recognized on the basis of the external communication information in the direction farther from the own vehicle 1 by the predetermined correction value, and executes the brake control based on the corrected target position, as illustrated by a solid line in FIGS. 9 and 10. Such a brake control decelerates the own vehicle 1 more moderately than the brake control based on the target position illustrated by a dashed-dotted line in FIGS. 9 and 10.

This prevents or suppresses excess deceleration of the own vehicle 1 due to the second brake control not only when the position of the preceding vehicle determined on the basis of the external communication information is farther from the own vehicle 1 than the actual position of the preceding vehicle recognized by the camera unit is, as illustrated in FIG. 10, but also when the position of the preceding vehicle determined on the basis of the external communication information is closer to the own vehicle 1 than the actual position of the preceding vehicle recognized by the camera unit is. Such a drive-assist apparatus 5 decelerates the own vehicle 1 without re-decelerating the own vehicle 1 even at the timing when the second brake control is switched to the first brake control, as illustrated by the dashed-dotted line in FIG. 9. Accordingly, it is possible for the drive-assist apparatus 5 to achieve appropriate deceleration of the own vehicle 1 without causing a feeling of strangeness of the driver.

In the foregoing example implementation, the drive-assist apparatus 5 may determine the correction value with which the target position is to be corrected, in accordance with a traveling environment including the weather, the road-surface condition, the period of time, and the curvature of the road in front of the own vehicle traveling on the traveling course. The correction value may be variable depending on the traveling environment and may be reduced as the traveling environment becomes deteriorated. This allows the first brake control to appropriately decelerate the own vehicle 1 without causing slipping of the own vehicle 1, for example, even when the position of the preceding vehicle determined on the basis of the external communication information is farther from the own vehicle 1 than the actual position of the preceding vehicle recognized with the camera unit is, as illustrated in FIG. 10.

Figure 13:
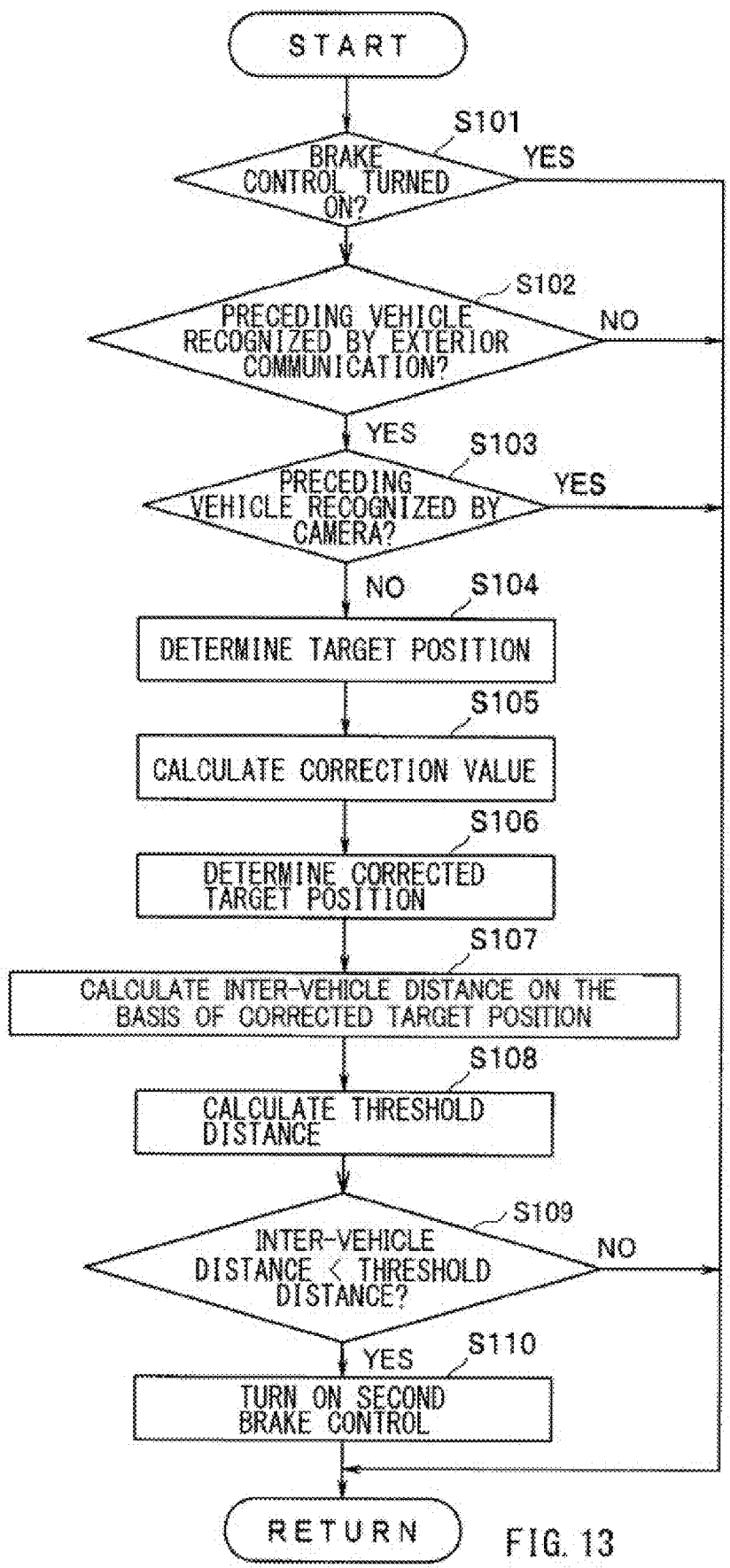
FIG. 13 is a flowchart illustrating an example routine according to one example modification for determining whether the second brake control is to be executed.
Figure 14:
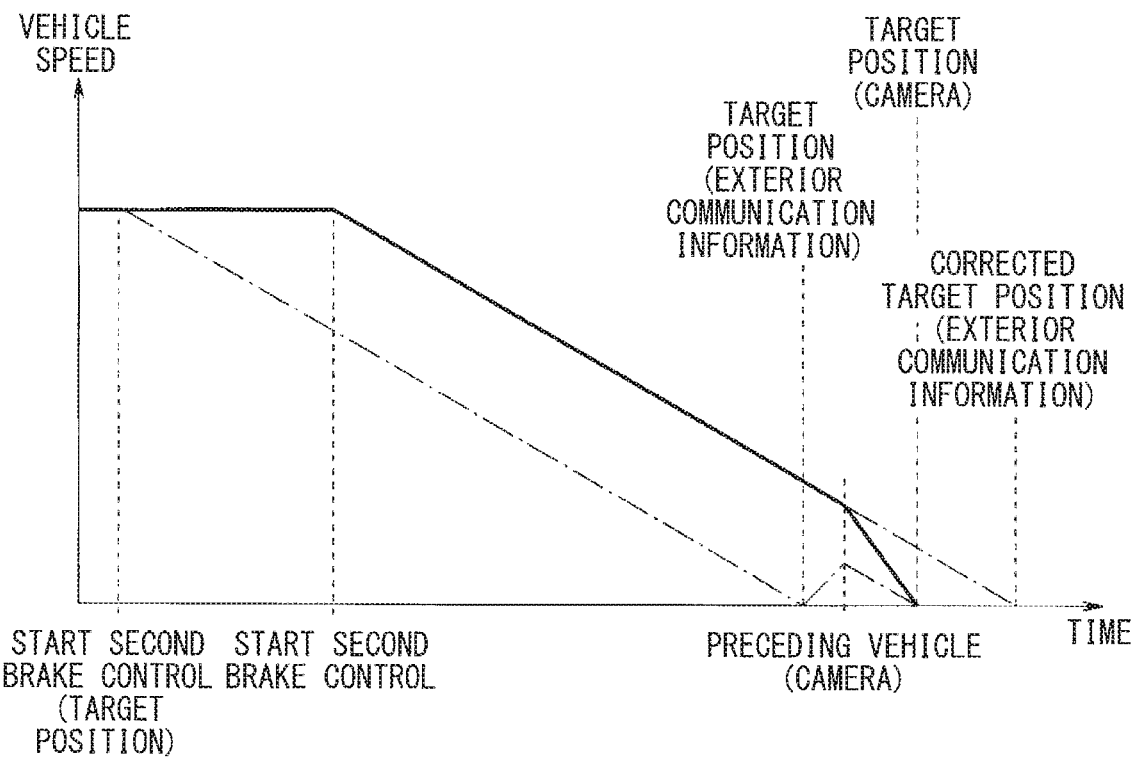
FIG. 14 is a graph illustrating an example operation of an automated brake control according to one example modification to be executed when the target position determined on the basis of the external communication information is closer to the own vehicle than the target position recognized by the camera unit is.
Figure 15:
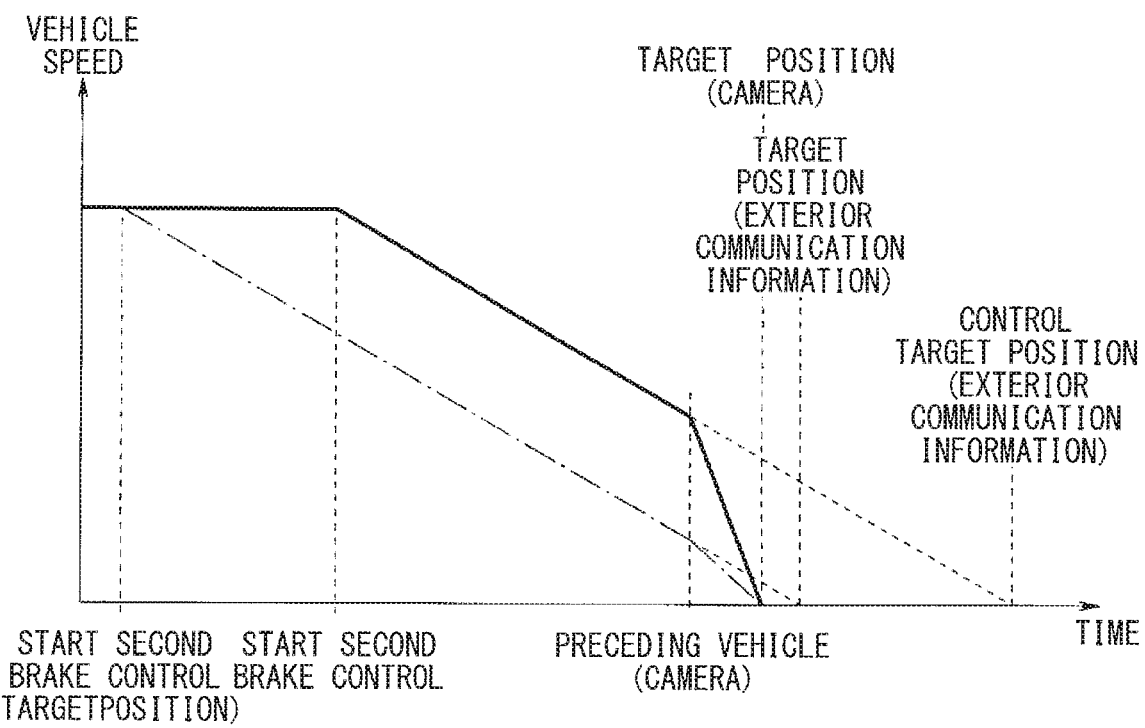
FIG. 15 is a graph illustrating an example operation of an automated brake control according to one example modification to be executed when the target position determined on the basis of the external communication information is farther from the own vehicle than the target position recognized by the camera unit is.

In an example modification illustrated in FIG. 13, for example, the inter-vehicle distance may be calculated on the basis of the corrected target position rather than the target position, in Step S107 described above. Such a calculation of the inter-vehicle distance based on the corrected target position allows the second brake control to start at a delayed timing, compared with the calculation of the inter-vehicle distance based on the target position, as illustrated in FIGS. 14 and 15. As a result, excess deceleration at the timing when the second brake control is switched to the first brake control is prevented or suppressed.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The drive-assist apparatus 5 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the drive-assist apparatus 5. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the drive-assist apparatus 5 illustrated in FIG. 1.

The invention claimed is:

1. A vehicle drive-assist apparatus comprising:
a first front-environment recognizer configured to recognize, using an autonomous sensor mounted on an own vehicle, a front environment in front of the own vehicle traveling on a traveling course;
a second front-environment recognizer configured to recognize the front environment on a basis of information received from an external device outside the own vehicle via external communication;
a first brake controller configured to, when a preceding vehicle is recognized by the first front-environment recognizer:
determine, on a basis of the preceding vehicle recognized by the first front-environment recognizer, a first target position where a vehicle speed of the own vehicle reaches a target vehicle speed; and
execute a first brake control based on the first target position; and
a second brake controller configured to, when the preceding vehicle is not recognized by the first front-environment recognizer and is recognized by the second front-environment recognizer:
determine a second target position on a basis of the preceding vehicle recognized by the second front-environment recognizer;
determine a corrected target position by correcting the second target position, wherein the corrected target position is set more forward along the traveling course than (1) the second target position and (2) a position of a rear end of the preceding vehicle recognized by the second front-environment recognizer;
determine an inter-vehicle distance, the inter-vehicle distance comprising a route distance from the own vehicle to the corrected target position;
calculate a threshold distance on a basis of a relative speed between the own vehicle and the preceding vehicle; and
start a second brake control based on the corrected target position when the inter-vehicle distance becomes less than the threshold distance, and execute the second brake control until the preceding vehicle is recognized by the first front-environment recognizer, wherein, during the second brake control, the second brake controller decelerates the own vehicle at a predetermined deceleration rate so that the vehicle speed of the own vehicle becomes equal to a vehicle speed of the preceding vehicle.

2. The vehicle drive-assist apparatus according to claim 1, wherein
the second brake controller determines the corrected target position by correcting the second target position using a correction value, and
the correction value is variable in accordance with a weather, the correction value being smaller when the weather is not a clear weather than when the weather is the clear weather.

3. The vehicle drive-assist apparatus according to claim 1, wherein
the second brake controller determines the corrected target position by correcting the second target position using a correction value, and
the correction value is variable in accordance with a condition of a road surface, the correction value being smaller when the road surface includes snow than when the road surface is a dry road surface.

4. The vehicle drive-assist apparatus according to claim 1, wherein
the second brake controller determines the corrected target position by correcting the second target position using a correction value, and
the correcting value is variable in accordance with a period of time, the correction value being smaller from sunset to sunrise than from sunrise to sunset.

5. The vehicle drive-assist apparatus according to claim 1, wherein
the second brake controller determines the corrected target position by correcting the second target position using a correction value, and
the correction value is variable in accordance with a curvature of the traveling course in front of the own vehicle, the correction value being reduced as the curvature increases.

6. A vehicle drive-assist apparatus comprising:
circuitry configured to
perform a first front-environment recognition to recognize, with an autonomous sensor mounted on an own vehicle, a front environment in front of the own vehicle traveling on a traveling course;
perform a second front-environment recognition to recognize the front environment on a basis of information received from an external device outside the own vehicle via external communication;
when a preceding vehicle is recognized by the first front-environment recognition, determine, on a basis of the preceding vehicle recognized by the first front-environment recognizer, a first target position where a vehicle speed of the own vehicle reaches a target vehicle speed; and execute a first brake control based on the first target position; and
when the preceding vehicle is not recognized by the first front-environment recognition and is recognized by the second front-environment recognition, (1) determine a second target position on a basis of the preceding vehicle recognized by the second front-environment recognizer; (2) determine a corrected target position by correcting the second target position, wherein the corrected target position is set more forward along the traveling course than (a) the second target position and (b) a position of a rear end of the preceding vehicle recognized by the second front-environment recognizer; (3) determine an inter-vehicle distance, the inter-vehicle distance comprising a route distance from the own vehicle to the corrected target position; (4) calculate a threshold distance on a basis of a relative speed between the own vehicle and the preceding vehicle; and (5) start a second brake control based on the corrected target position when the inter-vehicle distance becomes less than the threshold distance, and execute the second brake control until the preceding vehicle is recognized by the first front-environment recognition, wherein, during the second brake control, the circuitry decelerates the own vehicle at a predetermined deceleration rate so that the vehicle speed of the own vehicle becomes equal to a vehicle speed of the preceding vehicle.

7. A vehicle drive-assist apparatus comprising:
a first front-environment recognizer configured to recognize, with an autonomous sensor mounted on an own vehicle, a front environment in front of the own vehicle traveling on a traveling course;
a second front-environment recognizer configured to recognize the front environment on a basis of information received from an external device outside the own vehicle via external communication;
a first brake controller configured to, when a preceding vehicle is recognized by the first front-environment recognizer:
determine a first target position and a first target speed on a basis of the preceding vehicle which is recognized by the first front-environment recognizer, wherein the first target position is closer to the own vehicle by a first predetermined distance from the preceding vehicle; and
execute a first brake control that decelerates the own vehicle so that a speed of the own vehicle becomes equal to the first target speed at a timing when the own vehicle reaches the first target position; and
a second brake controller configured to, when the preceding vehicle is not recognized by the first front-environment recognizer and is recognized by the second front-environment recognizer:
determine a second target position and a second target speed on a basis of the preceding vehicle which is recognized by the second front-environment recognizer, wherein the second target position is closer to the own vehicle by a second predetermined distance from the preceding vehicle;
determine a correction value so that the correction value becomes smaller as a traveling environment of the own vehicle becomes deteriorated;
determine a corrected second target position that is shifted more forward along the traveling course by the correction value from the second target position, wherein the corrected second target position is set more forward along the traveling course than a position of a rear end of the preceding vehicle recognized by the second front-environment recognizer;
determine an inter-vehicle distance, the inter-vehicle distance comprising a route distance from the own vehicle to the corrected target position;

calculate a threshold distance on a basis of a relative speed between the own vehicle and the preceding vehicle; and start a second brake control that decelerates the own vehicle when the inter-vehicle distance becomes less than the threshold distance so that the speed of the own vehicle becomes equal to the second target speed at a timing when the own vehicle reaches the corrected second target position, and execute the second brake control until the preceding vehicle is recognized by the first front-environment recognizer, wherein, during the second brake control, the second brake controller decelerates the own vehicle at a predetermined deceleration rate so that the vehicle speed of the own vehicle becomes equal to a vehicle speed of the preceding vehicle.

8. The vehicle drive-assist apparatus according to claim 7, wherein the second brake controller determines the correction value on a basis of at least one of a weather, a condition of a road surface, a period of time, or a curvature of the traveling course.

\* \* \* \* \*